(12) United States Patent
Heo et al.

(10) Patent No.: US 8,958,351 B2
(45) Date of Patent: Feb. 17, 2015

(54) MOBILE TERMINAL

(75) Inventors: Won Heo, Gyeonggi-Do (KR); Mansoo Sin, Seoul (KR); Jeunguk Ha, Seoul (KR); Namsoo Kim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 422 days.

(21) Appl. No.: 13/469,044

(22) Filed: May 10, 2012

(65) Prior Publication Data

US 2013/0028148 A1    Jan. 31, 2013

(30) Foreign Application Priority Data

Jul. 28, 2011    (KR) .................. 10-2011-0075478

(51) Int. Cl.
*H04B 1/44*    (2006.01)
*H04B 1/00*    (2006.01)

(52) U.S. Cl.
CPC ............. *H04B 1/406* (2013.01); *H04B 1/005* (2013.01); *H04B 1/44* (2013.01)
USPC .......................................... 370/282; 370/278

(58) Field of Classification Search
USPC ............. 370/276, 277, 278, 282, 286
See application file for complete search history.

(56) References Cited

U.S. PATENT DOCUMENTS

| | | | | |
|---|---|---|---|---|
| 5,983,078 A * | 11/1999 | Bossard | .................. | 455/63.3 |
| 2003/0181192 A1 | 9/2003 | Park et al. | | |
| 2004/0116089 A1 | 6/2004 | Lee et al. | | |
| 2004/0224643 A1 | 11/2004 | Nakai | | |
| 2006/0189277 A1 * | 8/2006 | Ranta et al. | ................... | 455/78 |
| 2008/0317154 A1 * | 12/2008 | Nakajima et al. | ............ | 375/267 |
| 2009/0227214 A1 | 9/2009 | Georgantas et al. | | |
| 2010/0311353 A1 * | 12/2010 | Teillet et al. | ................... | 455/84 |
| 2011/0222444 A1 * | 9/2011 | Khlat et al. | .................. | 370/277 |
| 2013/0114470 A1 * | 5/2013 | Lee et al. | ..................... | 370/278 |
| 2013/0147678 A1 * | 6/2013 | Taniguchi | .................... | 343/853 |

FOREIGN PATENT DOCUMENTS

| | | |
|---|---|---|
| CN | 1445954 | 10/2003 |
| CN | 101442838 | 5/2009 |
| EP | 1670153 | 6/2006 |

(Continued)

OTHER PUBLICATIONS

European Patent Office Application Serial No. 12002330.4, Search Report dated Nov. 6, 2012, 7 pages.

(Continued)

*Primary Examiner* — Kwang B Yao
*Assistant Examiner* — Nguyen Ngo
(74) *Attorney, Agent, or Firm* — Lee, Hong, Degerman, Kang & Waimey

(57) ABSTRACT

A mobile terminal includes a main body and a wireless communication module mounted in the main body. The wireless communication module includes a first transceiver including transmit and receive terminals of a first signal, a second transceiver including transmit and receive terminals of a second signal, a first duplexer connected to the transmit terminal of the first signal and the receive terminal of the second signal to separate a transmit frequency of the first signal from a receive frequency of the second signal, and a second duplexer connected to the receive terminal of the first signal and the transmit terminal of the second signal to separate a receive frequency of the first signal from a transmit frequency of the second signal.

17 Claims, 19 Drawing Sheets

(56) References Cited

FOREIGN PATENT DOCUMENTS

| WO | 2009/066199 | 5/2009 |
| WO | 2011/119460 | 9/2011 |

OTHER PUBLICATIONS

The State Intellectual Property Office of the People's Republic of China Application Serial No. 201210172833.7, Office Action dated Jun. 26, 2014, 7 pages.

* cited by examiner

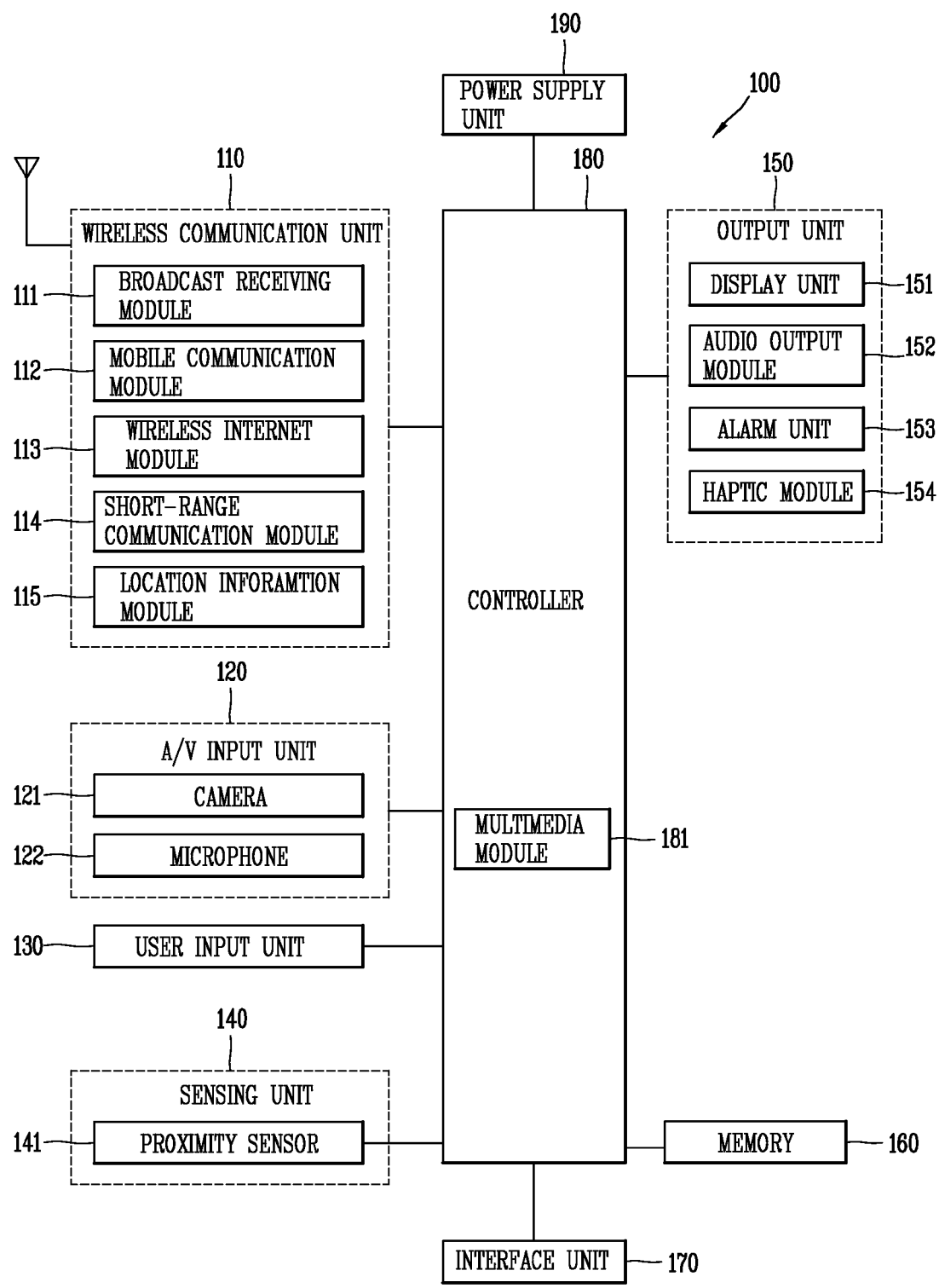

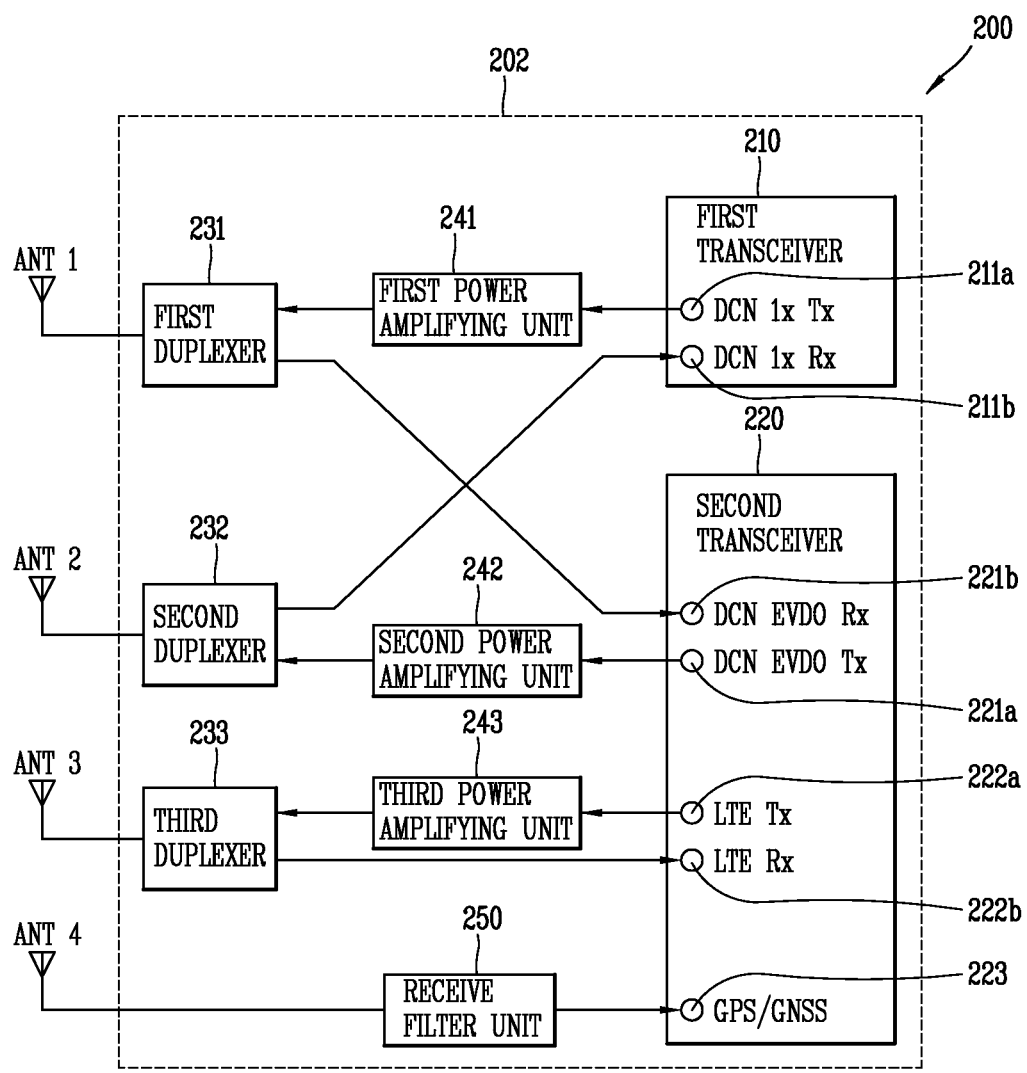

MOBILE TERMINAL

CROSS-REFERENCE TO RELATED APPLICATION

Pursuant to 35 U.S.C. §119(a), this application claims the benefit of earlier filing date and right of priority to Korean Application No. 10-2011-0075478, filed on Jul. 28, 2011, the contents of which are incorporated by reference herein in their entirety.

BACKGROUND OF THE INVENTION

1. Field of the Invention

The present invention relates to a mobile terminal, and particularly, to a mobile terminal supporting a plurality of mobile communication services.

2. Background of the Invention

Terminals can be classified into a mobile terminal and a stationary terminal based on its mobility. Furthermore, the mobile terminals can be further classified into a handheld terminal and a vehicle mount terminal. Mobile terminals can capture still or moving images, play music or video files, play games, receive broadcast and the like, so as to be implemented as an integrated multimedia player. Moreover, in order to support and enhance the function of the mobile terminal, improvements of the mobile terminal may be considered in the aspect of structure or software.

A mobile terminal may be configured to transmit and receive multiple frequency band signals in order to provide a plurality of mobile communication services such as Global System for Mobile communications (GSM), Code Division Multiple Access (CDMA), Wideband Code Division Multiple Access (WCDMA), and Long Term Evolution (LTE).

However, since the mobile terminal simultaneously processes the multiple frequency band signals, intermodulation distortion (IMD) may be generated. The IMD may deteriorate receiver sensitivity. Therefore, in order to stabilize performance in simultaneously providing the plurality of mobile communication services, it is required to design the wireless communication module of the mobile terminal so as to avoid the IMD.

SUMMARY OF THE INVENTION

Therefore, an aspect of the detailed description is to provide a mobile terminal capable of avoiding intermodulation distortion (IMD) generated by simultaneously processing multiple frequency band signals.

According to an embodiment of the present invention, a mobile terminal includes a main body and a wireless communication module mounted in the main body. The wireless communication module includes a first transceiver including transmit and receive terminals of a first signal, a second transceiver including transmit and receive terminals of a second signal, a first duplexer connected to the transmit terminal of the first signal and the receive terminal of the second signal to separate a transmit frequency of the first signal from a receive frequency of the second signal, and a second duplexer connected to the receive terminal of the first signal and the transmit terminal of the second signal to separate a receive frequency of the first signal from a transmit frequency of the second signal.

According to another embodiment of the present invention, a mobile terminal includes a main body, a wireless communication module mounted in the main body, and first to third antennas arranged in different regions of the main body and connected to the wireless communication module to emit first to third signals, respectively. The wireless communication module includes a first transceiver for controlling transmission and reception of the first signal, a second transceiver for selectively controlling transmission and reception of the second signal and transmission and reception of the third signal, first transmit and receive paths formed to transmit the first signal from the first transceiver to the first antenna and to transmit the first signal from the second antenna to the first transceiver, second transmit and receive paths formed to transmit the second signal from the second transceiver to the second antenna and to transmit the second signal from the first antenna to the second transceiver, and third transmit and receive paths formed to transmit the third signal from the second transceiver to the third antenna and to transmit the third signal from the third antenna to the second transceiver.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

FIG. 1 is a block diagram illustrating a mobile terminal according to an embodiment of the present invention.

FIG. 2 is a block diagram schematically illustrating a mobile terminal according to an embodiment of the present invention.

DETAILED DESCRIPTION OF THE INVENTION

Figure 3A:
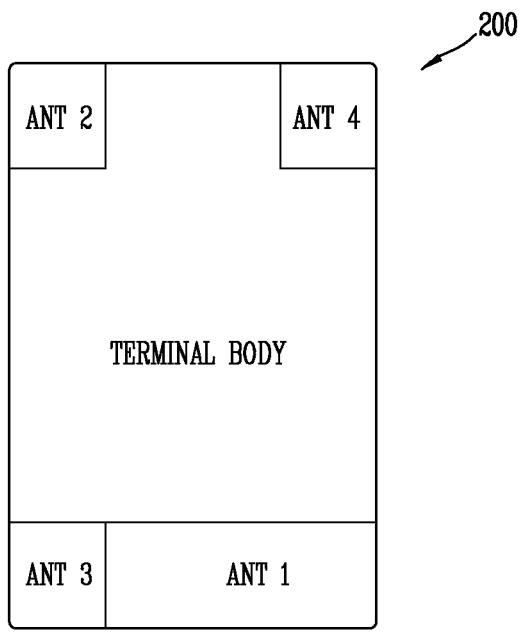
FIGS. 3A to 3C are conceptual illustrations of the antennas illustrated in FIG. 2 that are provided in a main body of the mobile terminal.

FIG. 1 is a block diagram illustrating a mobile terminal 100 according to one embodiment of the present invention. Referring to FIG. 1, the mobile terminal 100 may include a wireless communication unit 110, an audio/video (N/V) input unit 120, a user input unit 130, a sensing unit 140, an output unit 150, a memory 160, an interface unit 170, a controller 180, a power supply unit 190, and the like. However, the constituent elements as illustrated in FIG. 1 are not necessarily required, and the mobile terminal may be implemented with greater or less number of elements than those illustrated elements.

Hereinafter, the constituent elements 110-190 of the mobile terminal 100 will be described in sequence.

The wireless communication unit 110 typically includes one or more elements allowing radio communication between the mobile terminal 100 and a wireless communication system, or allowing radio communication between the mobile terminal 100 and a network in which the mobile terminal 100 is located. For example, the wireless communication unit 110 may include a broadcast receiving module 111, a mobile communication module 112, a wireless Internet module 113, a short-range communication module 114, a location information module 115, and the like.

The broadcast receiving module 111 receives broadcast signals and/or broadcast associated information from an external broadcast management server through a broadcast channel. Here, the broadcast associated information may mean information regarding a broadcast channel, a broadcast program, a broadcast service provider, and the like. The broadcast associated information may also be provided through a mobile communication network, and in this case, the broadcast associated information may be received by the mobile communication module 112. The broadcast signal and/or broadcast-associated information received through the broadcast receiving module 111 may be stored in the memory 160.

The mobile communication module 112 transmits and/or receives a radio signal to and/or from at least a base station, an external terminal or a server over a mobile communication network. Here, the radio signal may include a voice call signal, a video call signal and/or various types of data according to text and/or multimedia message transmission and/or reception.

The wireless Internet module 113, as a module for supporting wireless Internet access, may be built-in or externally installed to the mobile terminal 100. The wireless Internet module 113 may use a wireless Internet technique including WLAN (Wireless LAN), Wi-Fi, Wibro (Wireless Broadband), Wimax™ (World Interoperability for Microwave Access), HSDPA (High Speed Downlink Packet Access), and the like.

The short-range communication module 114 is a module for supporting a short-range communication. The short-range communication module 114 may use a short-range communication technology including Bluetooth™, Radio Frequency IDentification (RFID), Infrared Data Association (IrDA), Ultra WideBand (UWB), ZigBee™, and the like.

The location information module 115 is a module for checking or acquiring a location of the mobile terminal 100, and there is a global positioning system (GPS) module as a representative example.

Referring to FIG. 1, the AV (audio/video) input unit 120 receives an audio or video signal, and the AV (audio/video) input unit 120 may include a camera 121, a microphone 122, and the like. The camera 121 processes an image frame such as a still or moving image obtained by an image sensor in a video phone call or image capturing mode. The processed image frame may be displayed on a display unit 151. The image frames processed by the camera 121 may be stored in the memory 160 or transmitted to an external device through the wireless communication unit 110. Two or more cameras 121 may be provided according to the use environment of the mobile terminal 100.

The microphone 122 receives an external audio signal through a microphone in a phone call mode, a recording mode, a voice recognition mode, and the like, and processes the audio signal into electrical voice data. The processed voice data processed by the microphone 122 may be converted and output into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the mobile terminal 100. The user input unit 130 may be configured by including a key pad, a dome switch, a touch pad (pressure/capacitance), a jog wheel, a jog switch, or the like.

The sensing unit 140 detects a current status of the mobile terminal 100 such as an opened or closed status of the mobile terminal 100, a location of the mobile terminal 100, an orientation of the mobile terminal 100, and the like. The sensing unit 140 generates a sensing signal for controlling the operation of the mobile terminal 100.

For example, when the mobile terminal 100 is a slide phone type, the sensing unit 140 may sense an opened or closed status of the slide phone. Furthermore, the sensing unit 140 may sense whether power is supplied from the power supply unit 190, or whether an external device is coupled to the interface unit 170.

The sensing unit 140 may include a proximity sensor 141. Furthermore, the sensing unit 140 may include a touch sensor (not shown) for sensing a touch operation to the display unit 151.

The touch sensor may be implemented as a touch film, a touch sheet, a touch pad, and the like. The touch sensor may be configured to convert changes of a pressure applied to or a capacitance occurring from, a specific part of the display unit 151 into electric input signals. Also, the touch sensor may be configured to sense not only a touched position and a touched area, but also a touch pressure.

When the display unit 151 and the touch sensor have a layered structure therebetween, the display unit 151 may be used as an input device rather than or in addition to, an output device. The display unit 151 may be referred to as a "touch screen."

When there is a touch input through the touch screen, the corresponding signals are sent to a touch controller (not shown). The touch controller processes the received signals, and then transmits data corresponding to the processed signals to the controller 180. Accordingly, the controller 180 may sense which region of the display unit 151 has been touched.

When the touch screen is implemented with a capacitance type, it may be configured such that the proximity of a detection subject is sensed by changes of an electromagnetic field. In this case, the touch screen may be categorized as the proximity sensor 141.

The proximity sensor 141 refers to a sensor to detect the presence or absence of a detection subject using an electromagnetic field or infrared rays without a mechanical contact. The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, or the like.

Hereinafter, for the sake of convenience of brief explanation, a status that the pointer is positioned to be proximate onto the touch screen without contact will be referred to as "proximity touch," whereas a status that the pointer substantially comes in contact with the touch screen will be referred to as "contact touch." For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

The output unit 150 is configured to provide an output associated with visual sense, auditory sense, tactile sense, and the like, and the output unit 150 may include the display unit 151, an audio output module 152, an alarm unit 153, a haptic module 154, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or an e-ink display.

At least one display (or display element) included in the display unit 151 may be configured with a transparent or optical transparent type to allow viewing of the exterior through the display unit. It may be referred to as a transparent display. An example of the typical transparent displays may include a transparent LCD (TOLED), and the like. Under this configuration, a user can view an object positioned at a rear side of a terminal body through a region occupied by the display unit 151 of the terminal body.

The display unit 151 may be implemented in two or more in number according to a configured aspect of the mobile terminal 100. For instance, a plurality of the display units 151 may be arranged on one surface to be spaced apart from or integrated with each other, or may be arranged on different surfaces.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to the functions performed in the mobile terminal 100 (e.g., sound alarming a call received or a message received, and so on). The audio output module 152 may include a receiver, a speaker, a buzzer, and so on.

The alarm unit 153 outputs signals notifying occurrence of events from the mobile terminal 100. The events occurring from the mobile terminal 100 may include call received, message received, key signal input, touch input, and so on. The alarm unit 153 may output not only video or audio signals, but also other types of signals such as signals notifying occurrence of events in a vibration manner. Since the video or audio signals can be output through the display unit 151 or the audio output unit 152, the display unit 151 and the audio output module 152 may be categorized into part of the alarm unit 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched, air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects through a user's direct contact, or a user's muscular sense using a finger or a hand. The haptic module 154 may be implemented in two or more in number according to the configuration of the mobile terminal 100.

The memory 160 may store a program for processing and controlling the controller 180. Alternatively, the memory 160 may temporarily store input/output data (e.g., phonebook, messages, still images, videos, and the like). Also, the memory 160 may store data related to various patterns of vibrations and sounds output upon the touch input on the touch screen.

The memory 160 may be implemented using any type of suitable storage medium including a flash memory type, a hard disk type, a multimedia card micro type, a memory card type (e.g., SD or DX memory, etc.), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate in association with a web storage which performs the storage function of the memory 160 on the Internet.

The interface unit 170 may generally be implemented to interface the mobile terminal 100 with external devices. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as "identification device") may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power input from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component. The controller 180 can perform a pattern recognition processing so as to recognize writing or drawing input carried out on the touch screen as text or image.

The power supply unit 190 receives external and internal power to provide power required for various components under the control of the controller 180.

Various embodiments described herein may be implemented in a computer or similar device readable medium using software, hardware, or any combination thereof.

Hardware implementation may be implemented by using at least one of application specific integrated circuits (ASICs), digital signal processors (DSPs), digital signal processing devices (DSPDs), programmable logic devices (PLDs), field programmable gate arrays (FPGAs), processors, co-processors, controllers, micro-controllers, microprocessors, and electrical units designed to perform the functions described herein. In some cases, such embodiments may be implemented in the controller 180 itself.

For software implementation, the embodiments such as procedures or functions may be implemented together with separate software modules that allow performing of at least one function or operation. Software codes can be implemented by a software application written in any suitable programming language. The software codes may be stored in the memory 160 and executed by the controller 180.

Hereinafter, the processing method of a user input to the mobile terminal 100 will be described.

The user input unit 130 is manipulated to receive a command for controlling the operation of the portable terminal 100, and may include a plurality of manipulation units. The manipulation units may be commonly designated as a manipulating portion, and any method may be employed if it is a tactile manner allowing the user to perform manipulation with a tactile feeling.

Various kinds of visual information may be displayed on the display unit 151. The visual information may be displayed in a form of characters, numerals, symbols, graphics, or icons, or may be implemented in three-dimensional solid images. For an input of the visual information, at least one of the characters, numerals, symbols, graphics, or icons may be displayed with a predetermined arrangement so as to be implemented in a form of keypad. Such a keypad may be referred to as a so-called "soft key."

The display unit 151 may operate on an entire region or operate by dividing into a plurality of regions. In case of the latter, the plurality of regions may be configured to operate in an associative way.

For example, an output window and an input window may be displayed on the upper portion and lower portion of the display unit, respectively. The output window and the input window may be regions allocated to output or input information, respectively. A soft key on which numerals for inputting phone numbers or the like are displayed is displayed on the input window.

When the soft key is touched, numerals corresponding to the touched soft key are displayed on the output window. When the manipulating unit is manipulated, a call connection for the phone number displayed on the output window is attempted or text displayed on the output window may be input to an application.

The display unit 151 or the touch pad may be configured to sense a touch scroll. The user may move an object displayed on the display unit 151, for example, a cursor or pointer placed on an icon, by scrolling the display unit 151 or the touch pad. Moreover, when a finger is moved on the display unit 151 or the touch pad, a path of the finger may be visually displayed on the display unit 151. It may be useful to edit an image displayed on the display unit 151.

One function of the mobile terminal 100 may be executed when the display unit 151 and the touch pad are touched together within a predetermined period of time. Touching together may occur, for example, when the user clamps a terminal body of the mobile terminal 100 using the thumb and forefinger. One of the functions executed in the mobile terminal 100 may involve activation or de-activation for the display unit 151 or the touch pad.

Hereinafter, the structure of a mobile terminal for avoiding intermodulation distortion (IMD) generated by simultaneously processing multiple frequency band signals will be described in detail.

The mobile terminal according to the present invention may collectively provide 2 generation (2G), 3 generation (3G), and 4 generation (4G) mobile communication services, as well as future or other existing services. For example, the mobile terminal may be configured to simultaneously process the multiple frequency band signals used for mobile communication methods such as global system for mobile communications (GSM), code division multiple access (CDMA), wideband code division multiple access (WCDMA), long term evolution (LTE), etc.

The frequency bands of the mobile communication methods are as follows. The GSM method uses frequency bands such as 850 MHz, 900 MHz, 1,800 MHz, and 1,900 MHz. A 2G CDMA method (IS-95) and 3G CDMA method (such as CDMA2000 and WCDMA) may be divided into a digital cellular network (DCN) method and a personal communication service (PCS) method. The DCN method uses frequency bands such as 800 MHz and 850 MHz. The PCS method uses frequency bands such as 1,800 MHz (IS-95), 1,900 MHz (CDMA2000), and 2,100 MHz (WCDMA). The LTE method uses a frequency band of 700 MHz.

FIG. 2 is a block diagram schematically illustrating a mobile terminal 200 according to an embodiment of the present invention. Referring to FIG. 2, the mobile terminal 200 may include a wireless communication module 202 and first to fourth antennas ANT1 to ANT4.

A wireless communication module 202 is mounted in a main body of the mobile terminal 200 and may include first and second transceivers 210 and 220, duplexers 231 to 233, power amplifying units 241 to 243, and a receive filter unit 250.

The first and second transceivers 210 and 220 may each include at least one transmit terminal and receive terminal. For example, the first transceiver 210 may include transmit and receive terminals 211*a* and 211*b* of a first signal. The second transceiver 220 may include transmit and receive terminals 221*a* and 221*b* of a second signal, transmit and receive terminals 222*a* and 222*b* of a third signal, and a receive terminal 223 of a global positioning system (GPS)/global navigation satellite system (GNSS) signal (hereinafter, referred to as a GPS signal).

Here, the first signal is a signal in accordance with a DCN 1×, the second signal is a signal in accordance with a DCN evolution-data optimized or evolution data only (EVDO) method in which the same frequency band (for example, 850 MHz) as used in the DCN 1× method is used, and the third signal may be a signal in accordance with the LTE method in which a different frequency band (for example, 700 MHz) from frequency bands used in the DCN1× and the DCN EVDO method is used. That is, the first signal is a radio frequency (RF) signal for a voice service and the second and third signals may be wireless frequency signals for data services.

The first transceiver 210 may control the transmission and reception of the first signal. The second transceiver 220 may selectively control the transmission and reception of the second and third signals. That is, the second transceiver 220 may not transmit and receive the third signal while transmitting and receiving the second signal. The second transceiver 220 may not transmit and receive the second signal while transmitting and receiving the third signal. In addition, the second transceiver 220 may control the reception of the GPS signal.

The first duplexer 231 is connected to the first antenna ANT1, the transmit terminal 211a of the first signal, and the receive terminal 221b of the second signal and may separate the transmit frequency of the first signal from the receive frequency of the second signal, which means that the first signal and the second signal may be separated from each other when the first signal is transmitted from the first transceiver 210 to the first antenna ANT1 and the second signal is received from the first antenna ANT1 and passed to the second transceiver 220.

The second duplexer 232 is connected to the second antenna ANT2, the receive terminal 211b of the first signal, and the transmit terminal 221a of the second signal and may separate the receive frequency of the first signal from the transmit frequency of the second signal, which means the first signal and the second signal may be separated from each other when the second signal is transmitted from the second transceiver 220 to the second antenna ANT2 and the first signal is received from the second antenna ANT2 and passed to the first transceiver 210.

The third duplexer 233 is connected to the third antenna ANT3 and the transmit and receive terminals 222a and 222b of the third signal and may separate the transmit and receive frequencies of the third signal from each other.

The first power amplifying unit 241 is connected between the first duplexer 231 and the transmit terminal 211a of the first signal to amplify the power of the first signal. Therefore, although not shown in the drawing, the first power amplifying unit 241 may include a transmit filter, a power amplifier, and an isolator. The transmit filter in the first power amplifying unit 241 may transmit the transmit frequency of the first signal and may remove the noise mixed in the first signal. The transmit filter may be realized by a surface acoustic wave (SAW) filter. The power amplifier amplifies the power of the first signal transmitted from the SAW filter. The isolator isolates the reflected wave of the first signal received in a reverse direction to prevent the power amplifier from being damaged.

The second power amplifying unit 242 is connected between the second duplexer 232 and the transmit terminal 221a of the second signal to amplify the power of the second signal. The third power amplifying unit 243 is connected between the third duplexer 243 and the transmit terminal 222a of the third signal to amplify the power of the third signal. The second and third power amplifying units 242 and 243 may have the same structure as the first power amplifying unit 241.

The receive filter unit 250 is connected between the fourth antenna ANT4 and the receive terminal 223 of the GPS signal to transmit the receive frequency of the GPS signal. Therefore, although not shown in the drawing, the receive filter unit 250 may include a low noise amplifier (LNA) and at least one receive filter. The LNA amplifies the GPS signal transmitted from the fourth antenna ANT4. The receive filter transmits the receive frequency of the GPS signal. The receive filter may be realized by the SAW filter.

Hereinafter, the transmit and receive paths of the first to third signals formed in accordance with the structure of the above-described wireless communication module 202 will be described.

The transmit and receive paths of the first signal (hereinafter, referred to as first transmit and receive paths) include a first transmit path and a first receive path. The first transmit path may be formed to transmit the first signal from the first transceiver 210 to the first antenna ANT1 and the first receive path may be formed to receive the first signal from the second antenna ANT2 to the first transceiver 210.

The transmit and receive paths of the second signal (hereinafter, referred to as second transmit and receive paths) include a second transmit path and a second receive path. The second transmit path may be formed to transmit the second signal from the second transceiver 220 to the second antenna ANT2 and the second receive path may be formed to receive the second signal from the first antenna ANT1 to the second transceiver 220.

As described above, the first transmit path and the second receive path may be formed to share the first duplexer 231. The second transmit path and the first receive path may be formed to share the second duplexer 232.

The transmit and receive paths of the third signal (hereinafter, referred to as third transmit and receive paths) include a third transmit path and a third receive path. The third transmit path may be formed to transmit the third signal from the second transceiver 220 to the third antenna ANT3 and the third receive path may be formed to receive the third signal from the third antenna ANT3 to the second transceiver 220.

The first to fourth antennas ANT1 to ANT4 may be arranged in different regions of the main body of the mobile terminal 200. The degree of isolation between any two antennas among the first to fourth antennas ANT1 to ANT4 may be determined in accordance with the arrangement of the two antennas. For example, as the two antennas are remote from each other, the degree of isolation between the two antennas may increase.

The first to third antennas ANT1 to ANT3 emit the first to third signals transmitted through the first to third transmit paths as illustrated in FIG. 2. At this time, as the signal emitted through one antenna may be attenuated by the degree of isolation between the two antennas while the signal emitted through one antenna is received by another antenna. For example, after the third signal emitted through the third antenna ANT3 is attenuated by the degree of isolation between the first and third antennas ANT1 and ANT3, the third signal may be received by the first antenna ANT1.

As the attenuated third signal and the first signal transmitted from the first power amplifying unit 241 are simultaneously processed by the first duplexer 231 that is a nonlinear element, an IMD signal (hereinafter, referred to as a first IMD signal) may be generated.

In order to remove the first IMD signal, a notch filter for rejecting the frequency band corresponding to the first IMD signal may be connected to the first duplexer 231. However, since the notch filter is generally manufactured using a dielectric substance, the volume of the notch filter is significantly large. Therefore, when the notch filter is used, the size of the mobile terminal may increase. In addition, the first IMD signal may not be completely removed by the notch filter.

On the other hand, according to an aspect of the present invention, although the first IMD signal is generated, since the first IMD signal is transmitted to the receive terminal 221b of the second signal, the first IMD signal does not affect the receiver sensitivity of the first signal.

As described above, while the third signal is transmitted and received, the second signal is not transmitted and received and the first IMD signal is generated on the assumption of the transmission and reception of the third signal. Therefore, when the first IMD signal is generated, the second signal is not transmitted and received. Therefore, although the first IMD signal is transmitted to the receive terminal 221b of the second signal through the second receive path, the receiver sensitivity of the second signal is not affected.

On the other hand, when the first and third signals are simultaneously emitted through the first and third antennas ANT1 and ANT3, the first signal attenuated by the degree of isolation between the first and second antennas ANT1 and ANT2 and the third signal attenuated by the degree of isolation between the second and third antennas ANT2 and ANT3 may be received to the second antenna ANT2.

As the attenuated first and third signals are simultaneously processed by the second duplexer 232, an IMD signal (hereinafter, a second IMD signal) may be generated. However, unlike the first IMD signal generated in the state where only the third signal among the first and third signals is attenuated, since the second IMD signal is generated in the state where the first and third signals are attenuated, the intensity of the second IMD signal may be measured in the allowed range of communication standard.

Therefore, although the second IMD signal is transmitted to the receive terminal 211b of the first signal through the first receive path, the receiver sensitivity of the first signal does not significantly deteriorate. Furthermore, when the antennas ANT1 to ANT4 are arranged in the main body of the mobile terminal 200 such that the degree of isolation between the first and second antennas ANT1 and ANT2 and the degree of isolation between the second and third antennas ANT2 and ANT3 increase, the intensity of the second IMD signal may be further reduced.

In short, in the structure of the wireless communication module 202 according to an embodiment of the present invention, the first IMD signal is thrown through the receive path in an idle state while multiple frequency band signals are simultaneously processed such that it is possible to prevent the receiver sensitivities of the first and second signals from deteriorating due to the first IMD signal without using the notch filter. Therefore, the size of the mobile terminal capable of simultaneously processing the multiple frequency band signals may be reduced and performance may be stabilized.

In addition, in the structure of the wireless communication module 202 and the antennas ANT1 to ANT4 of the wireless communication module 202 according to the embodiment of the present invention, the magnitude of the second IMD signal is reduced to be in an allowed range such that it is possible to prevent the receiver sensitivity of the first signal from deteriorating due to the second IMD signal.

Figure 3B:
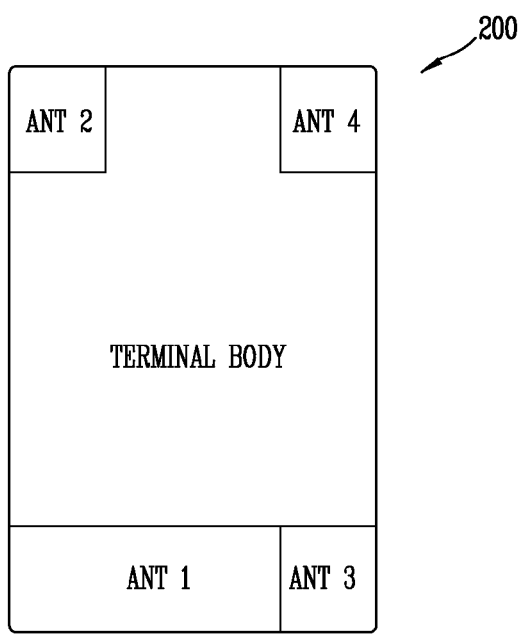
Figure 3C:
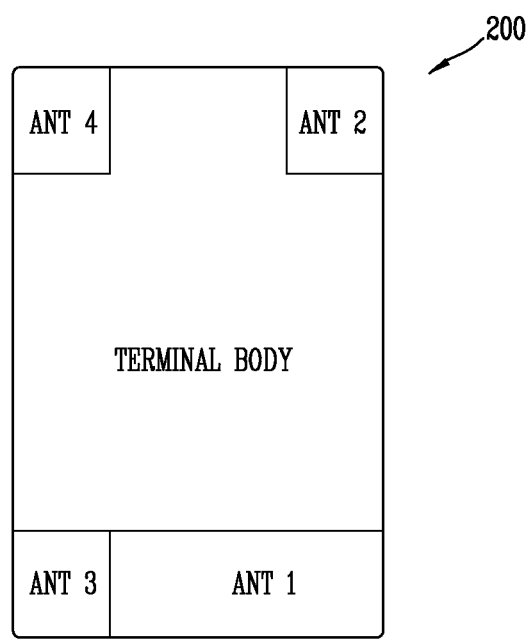

FIGS. 3A to 3C Illustrate examples in which the antennas ANT1 to ANT4 illustrated in FIG. 2 are arranged in the main body of the mobile terminal 200. The first to fourth antennas ANT1 to ANT4 may be arranged in different regions of the main body of the mobile terminal 200. For example, as illustrated in FIGS. 3A to 3C, the first to fourth antennas ANT1 to ANT4 may be arranged at edge portions of the main body of the mobile terminal 200.

Referring to FIG. 3A, the first to fourth antennas ANT1 to ANT4 may be arranged at the right lower end, the left upper end, left lower end, and right upper end, respectively. The degree of isolation between any two antennas among the first to fourth antennas ANT1 to ANT4 may be determined in accordance with the arrangement of the two antennas, in particular, the distance between the two antennas.

In order to increase the degree of isolation between the first and second antennas ANT1 and ANT2 or the degree of isolation between the second and third antennas ANT2 and ANT3 to reduce the intensity of the second IMD signal, the antennas ANT1 to ANT4 may be arranged such that the distance between the first and second antennas ANT1 and ANT2 and the distance between the second and third antennas ANT2 and ANT3 are as far as possible. In addition, the antennas ANT1 to ANT4 may be arranged such that the degree of isolation between the first and second antennas ANT1 and ANT2 or the degree of isolation between the second and third antennas ANT2 and ANT3 is larger than the degree of isolation between the first and third antennas ANT1 and ANT3.

In FIGS. 3B and 3C, the positions of the first and third antennas ANT1 and ANT3 are reversed, and the positions of the second and fourth antennas ANT2 and ANT4 are reversed, respectively, relative to the arrangement exemplified in FIG. 3A.

The examples in which the antennas ANT1 to ANT4 illustrated in FIGS. 3A to 3C are arranged in the main body of the mobile terminal 200 may be applied to the modifications of the mobile terminal 200 illustrated in FIGS. 4 to 9. The signals emitted by the antennas ANT1 to ANT4 may vary in accordance with the modifications.

FIGS. 4 to 9 are block diagrams illustrating the modifications of the mobile terminal 200 illustrated in FIG. 2. Hereinafter, differences between the modifications of the mobile terminal 200 illustrated in FIG. 2, in particular, the modifications of the wireless communication module 202 will be described.

Figure 4:
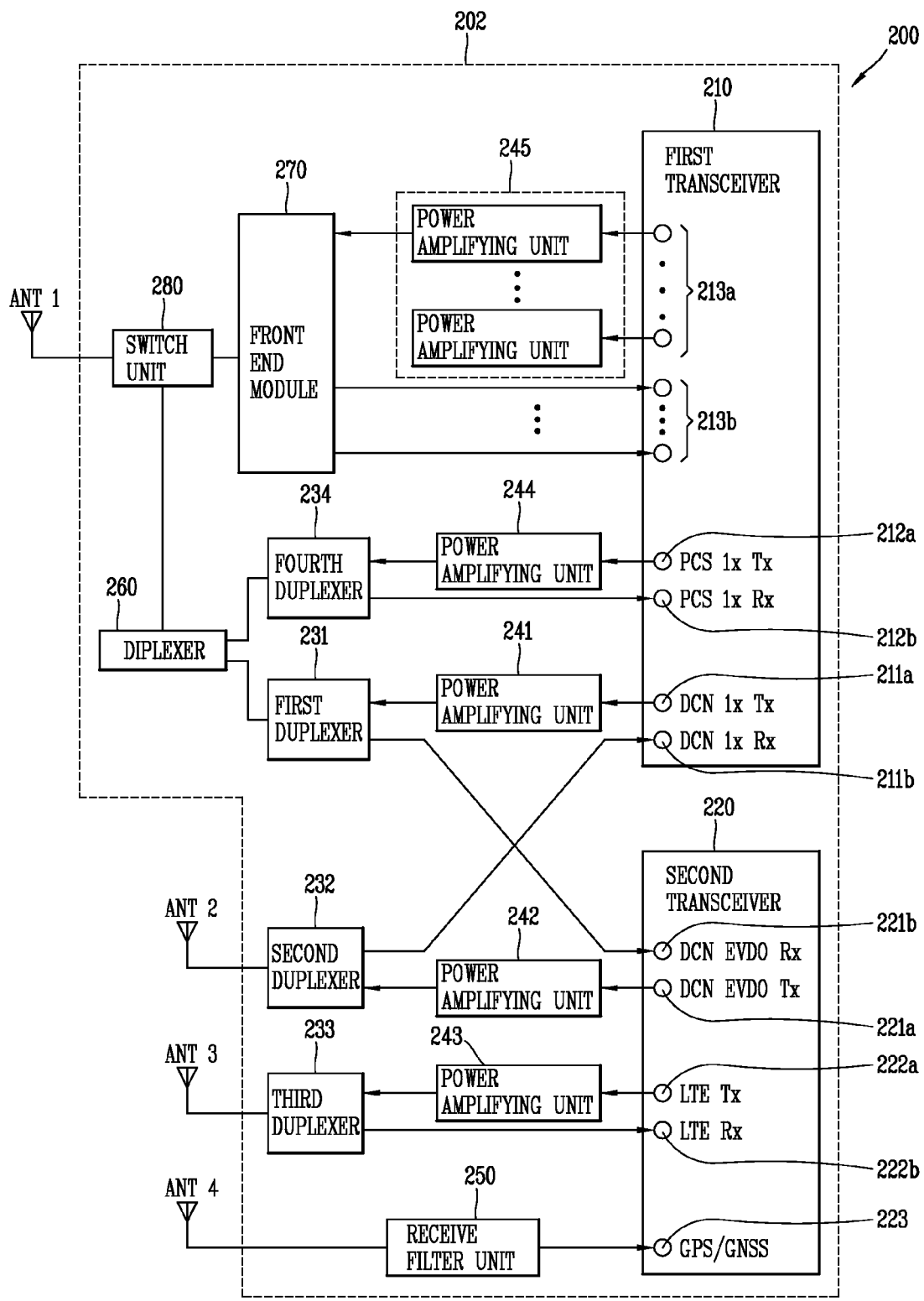
FIGS. 4 to 9 are block diagrams illustrating modifications of the mobile terminal illustrated in FIG. 2.

Referring to FIG. 4, the wireless communication module 202 may include the first and second transceivers 210 and 220, the duplexers 231 to 234, the power amplifying units 241 to 245, the receive filter unit 250, a diplexer 260, a front end module (FEM) 270, and a switch unit 280.

The first transceiver 210 includes transmit and receive terminals 212a and 212b of a fourth signal having a different frequency band (for example, 1,900 MHz) from the frequency band of the first to third signals and may control the transmission and reception of the fourth signal. Here, the fourth signal may, by way of example, be a wireless frequency signal for a signal in accordance with the PCS 1× method, that is, a voice service.

In addition, the first transceiver 210 may include the transmit and receive terminals 213a and 213b of other signals having different frequency bands, for example, signals in accordance with GSM methods (hereinafter, referred to as GSM signals) to control the transmission and reception of the GSM signals. The other signals are not limited to the GSM signals but may include various signals.

The transmit and receive paths of the fourth signal (hereinafter, referred to as fourth transmit and receive paths) include a fourth transmit path and a fourth receive path. The fourth transmit path may be formed to transmit the fourth signal from the first transceiver 210 to the first antenna ANT1 and the fourth receive path may be formed to receive the fourth signal from the first antenna ANT1 to the first transceiver 210.

The fourth duplexer 234 is connected to the first antenna ANT1, the transmit terminal 212a of the fourth signal, and the receive terminal 212b of the fourth signal to separate the transmit frequency of the fourth signal from the receive frequency of the fourth signal.

The fourth power amplifying unit 244 is connected between the fourth duplexer 234 and the transmit terminal 212a of the fourth signal to amplify the power of the fourth signal. The power amplifying units 245 are connected between the FEM 270 and the transmit terminals 213a of the GSM signals to amplify the power of the GSM signals.

The diplexer 260 is connected to the first and fourth duplexers 231 and 234 and the switch unit 280 to separate the frequency band of the first signal from the frequency band of the fourth signal.

The FEM 270 is connected between the first transceiver 210 and the switch unit 280 and may be configured to select one of the transmit and receive paths of the GSM signals. That is, the FEM 270 may switch the transmit and receive paths of the GSM signals. In addition, the FEM 270 may separate the transmit frequency of each GSM signal from the receive frequency of each GSM signal.

The switch unit 280 may be configured to selectively connect one of the diplexer 260 and the FEM 270 to the first antenna ANT1. The switch unit 280 may be realized in the form of a single pole double throw (SPDT) switch.

The switch unit 280 that is a non-linear element may generate an IMD signal (hereinafter, referred to as a third IMD signal) as the first IMD signal is generated. However, the third IMD signal may be avoided similar to the method of avoiding the first IMD signal.

The third IMD signal may be emitted through the first antenna ANT1 to be received by the second antenna ANT2. Since the third IMD signal is attenuated by the degree of isolation between the first and second antennas ANT1 and ANT2, the intensity of the third IMD signal received through the second antenna ANT2 may be measured to be in the allowed range of the communication standard. Therefore, although the third IMD signal is sent to the receive terminal 211b of the first signal through the first receive path, the receiver sensitivity of the first signal does not significantly deteriorate.

Figure 5:
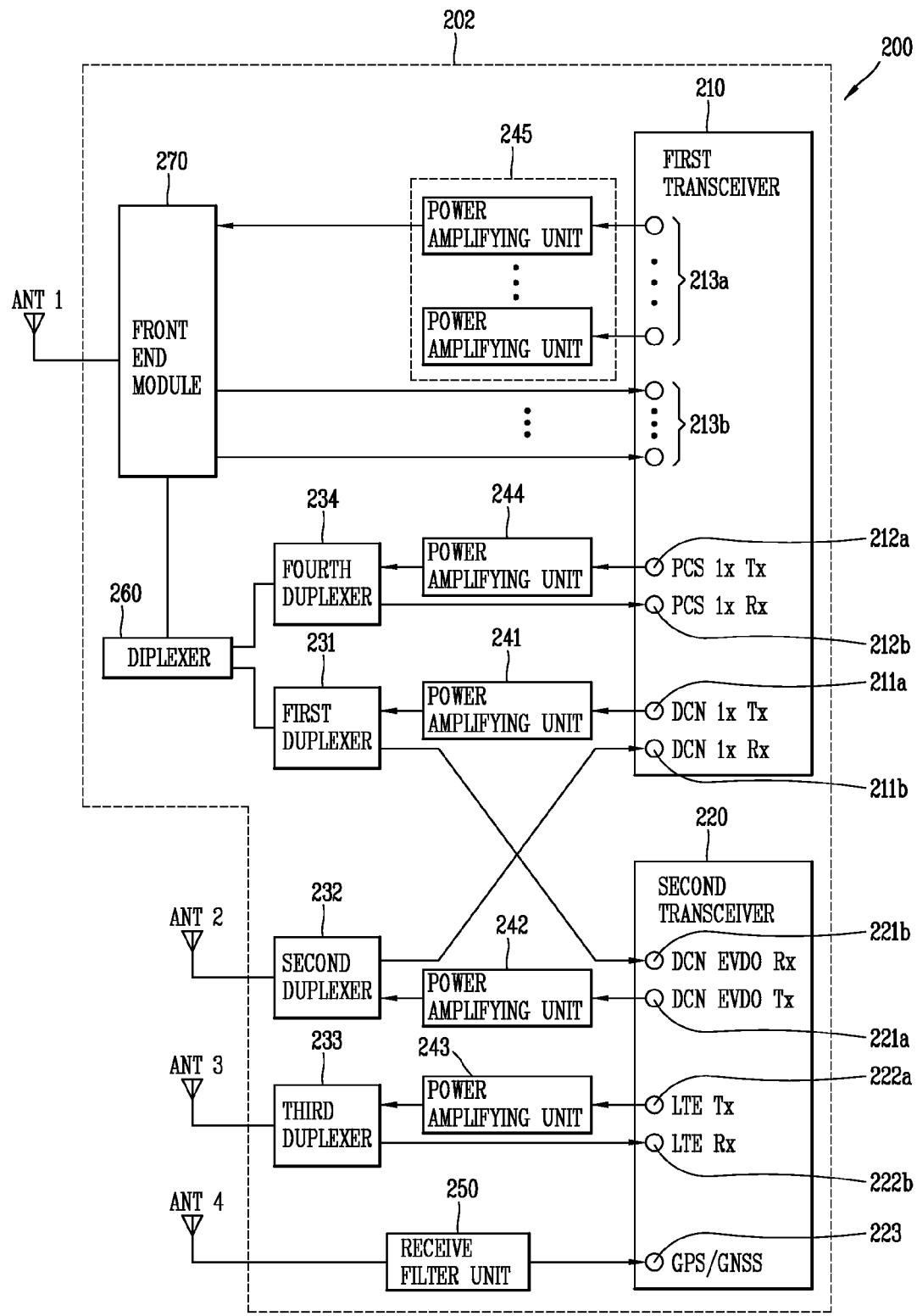
Figure 6:
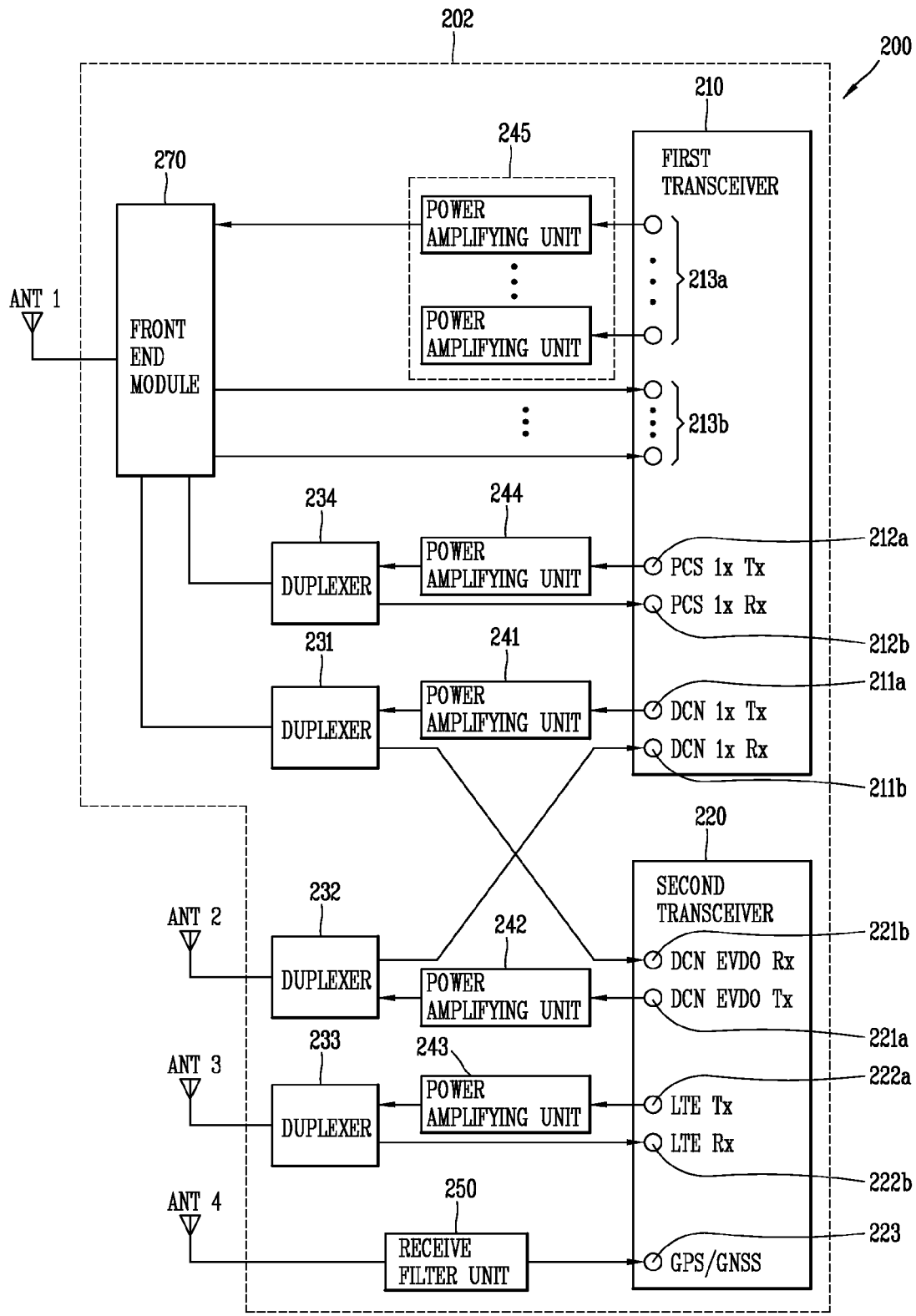

Referring to FIG. 5, the FEM 270 may be configured to perform the function of the switch unit 280 illustrated in FIG. 4. Referring to FIG. 6, the FEM 270 may be configured to perform the function of the diplexer 260 as well as the function of the switch unit 280 illustrated in FIG. 4. As described above, the non-linear element that is the source of generating the IMD signal is removed from the wireless communication module 202 to reduce the generation of the IMD signal.

Figure 7:
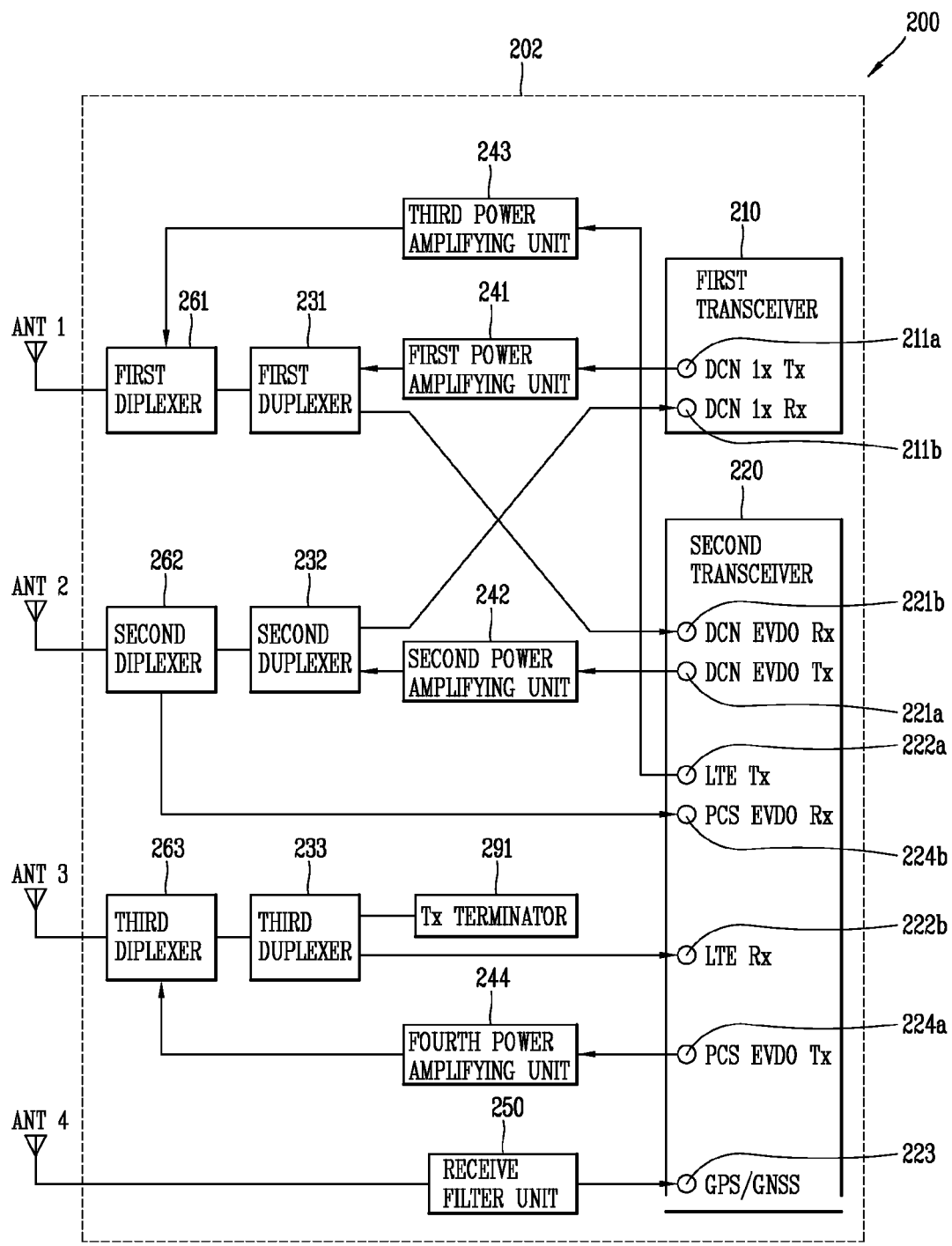

Referring to FIG. 7, the wireless communication module 202 may include the first and second transceivers 210 and 220, the duplexers 231 to 233, the power amplifying units 241 to 244, the receive filter unit 250, diplexers 261 to 263, and a terminator 291.

The second transceiver 220 includes the transmit and receive terminals 224a and 224b of the fourth signal having a different frequency band (for example, 1,900 MHz) from the frequency band of the first to third signals and may control the transmission and reception of the fourth signal. Here, by way of example, the fourth signal may be a signal in accordance with a PCS EVDO method, that is, a wireless frequency signal for a data service.

The first diplexer 261 is connected to the first antenna ANT1, the first duplexer 231, and the third power amplifying unit 243 and may separate the frequency bands of the signals processed by the first duplexer 231 (the composite frequency bands of the first and second signals) from the frequency band of the third signal.

The second diplexer 262 is connected to the second antenna ANT2, the second duplexer 232, and the second power amplifying unit 242 and may separate the frequency bands (the composite frequency bands of the first and second signals) of the signals processed by the second duplexer 232 from the frequency band of the fourth signal.

The third diplexer 263 is connected to the third antenna ANT3, the third duplexer 233, and the fourth power amplifying unit 244 to separate the frequency band of the third signal from the frequency band of the fourth signal.

A difference from the signal transmit path illustrated in FIG. 2 lies in that the third transmit path may be formed to transmit the third signal from the second transceiver 220 to the first antenna ANT1. Therefore, the terminator 291 instead of the transmit terminal 222a of the third signal may be connected to the third duplexer 233. Here, the terminator 291 may have a resistance value of 50Ω. The fourth transmit path may be formed to transmit the fourth signal from the second transceiver 220 to the third antenna ANT3. The fourth receive path may be formed to transmit the fourth signal from the second antenna ANT2 to the second transceiver 220. The other signal transmit paths are as illustrated in FIG. 2.

Figure 8:
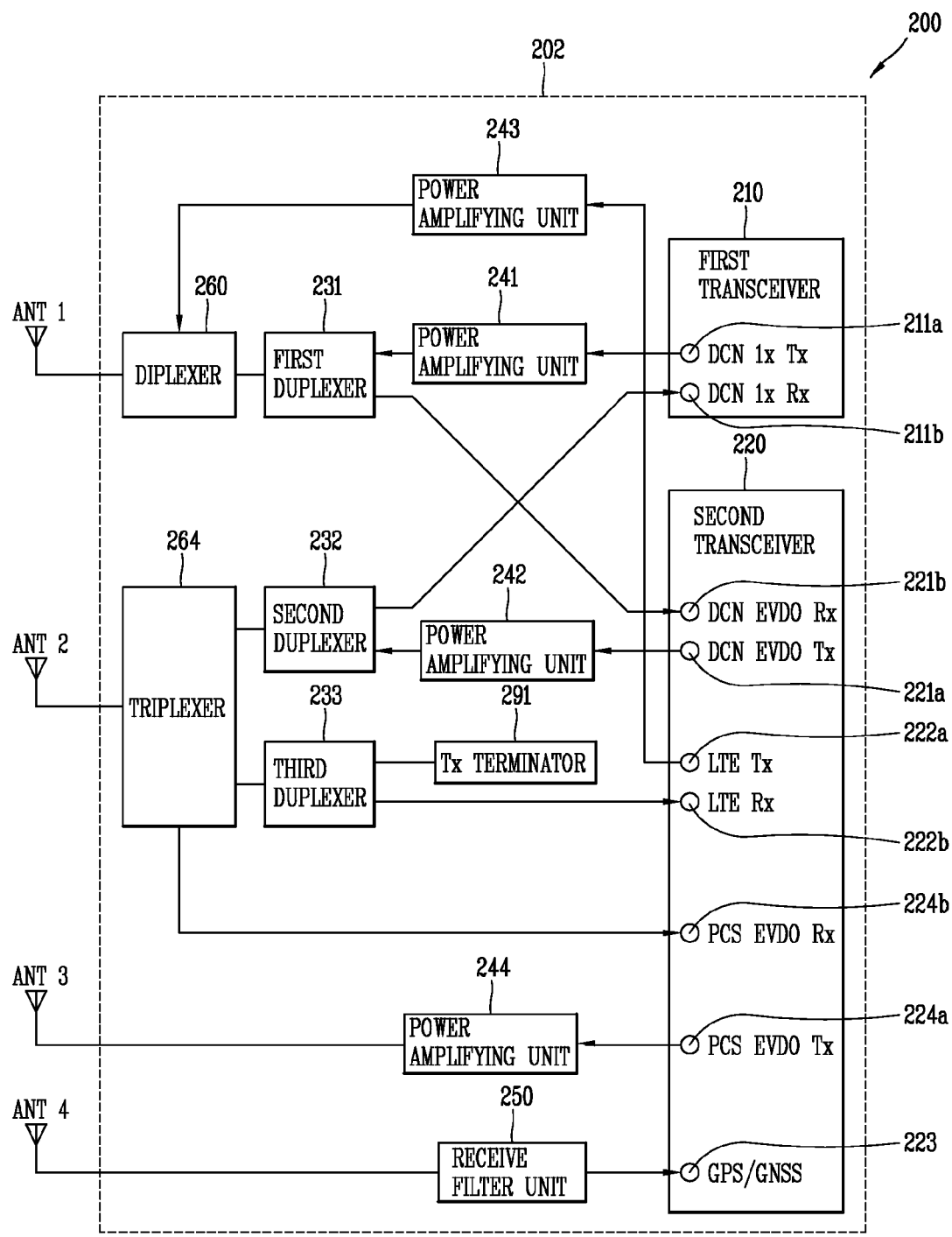

Referring to FIG. 8, the wireless communication module 202 may include the first and second transceivers 210 and 220, the duplexers 231 to 233, the power amplifying units 241 to 244, the receive filter unit 250, the diplexer 260, a triplexer 264, and the terminator 291.

The triplexer 264 is connected to the second antenna ANT2, the receive terminal 224b of the fourth signal, and the second and third duplexers 232 and 233. The triplexer 264 may separate the frequency bands of the signals processed by the second duplexer 232 (the synthetic frequency bands of the first and second signals), the frequency band of the signal (the third signal) processed by the second duplexer 232, and the frequency band of the fourth signal from each other.

A difference from the signal transmit path illustrated in FIG. 7 lies in that the third receive path may be formed to receive the third signal from the second antenna ANT2 to the second transceiver 220. The other signal transmit paths are as illustrated in FIG. 7.

Figure 9:
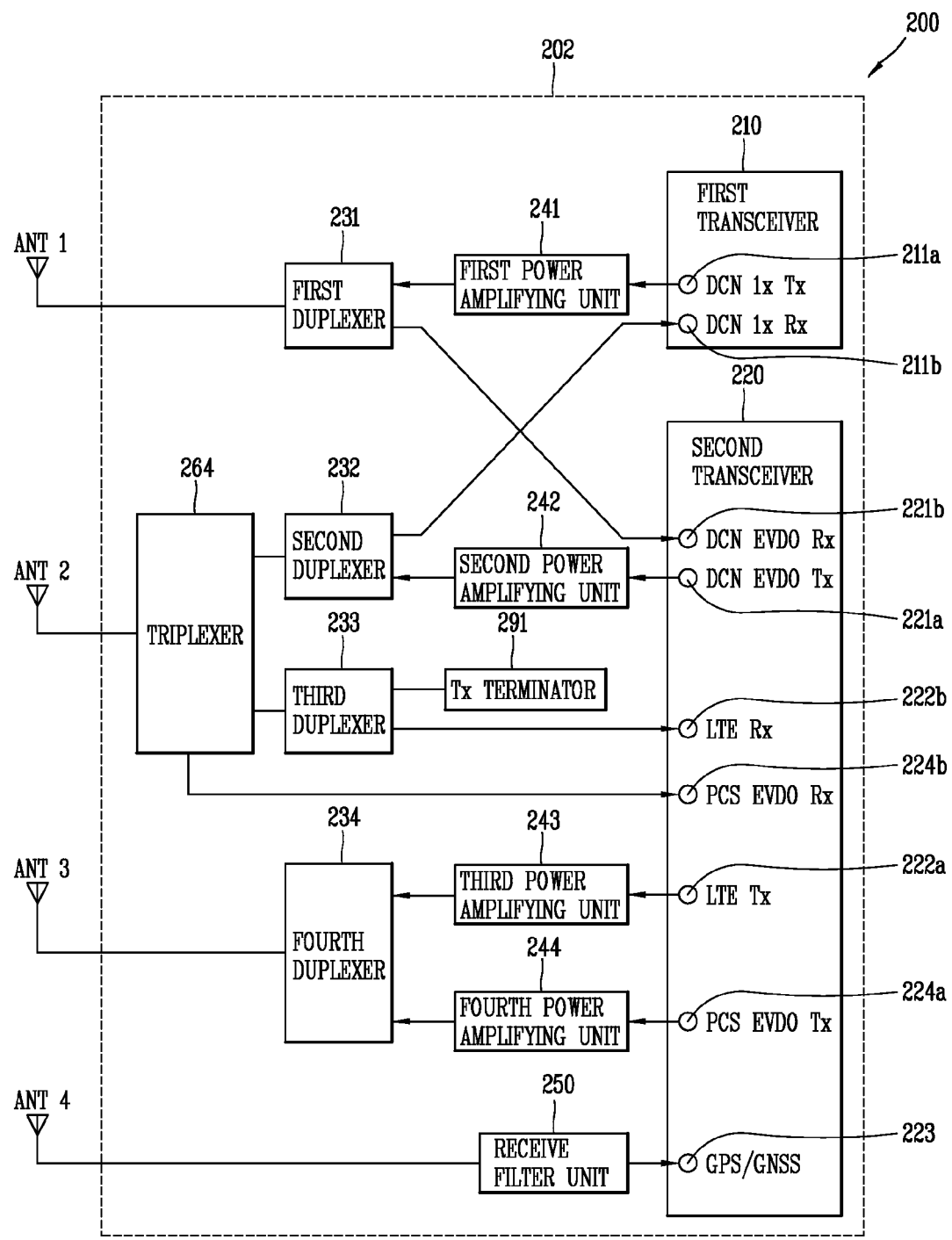

Referring to FIG. 9, the wireless communication module 202 may include the first and second transceivers 210 and 220, the duplexers 231 to 234, the power amplifying units 241 to 244, the receive filter unit 250, the triplexer 264, and the terminator 291.

The fourth duplexer 234 is connected to the third antenna ANT3 and the third and fourth power amplifying units 243 and 244 to separate the transmit frequency of the third signal from the transmit frequency of the fourth signal.

A difference from the signal transmit path illustrated in FIG. 8 lies in that the third transmit path may be formed to transmit the third signal from the second transceiver 220 to the third antenna ANT3. The other signal transmit paths are as illustrated in FIG. 8.

Figure 10:
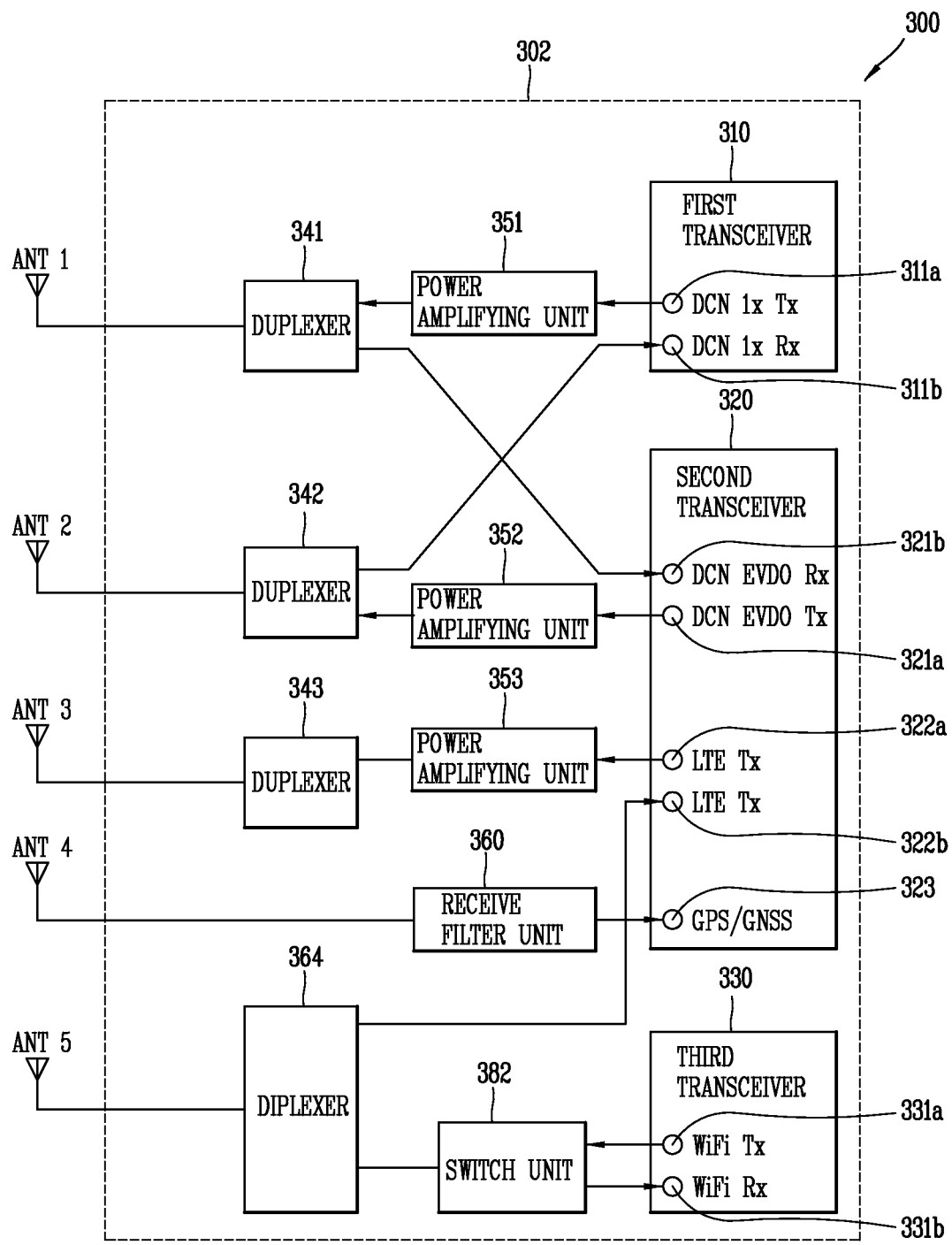
FIG. 10 is a block diagram schematically illustrating a mobile terminal according to another embodiment of the present invention.

FIG. 10 is a block diagram schematically illustrating a mobile terminal 300 according to another embodiment of the present invention. Hereinafter, a difference from the mobile terminal 200 illustrated in FIG. 2 will be described.

Referring to FIG. 10, the mobile terminal 300 may include a wireless communication module 302 and first to fifth antennas ANT1 to ANT5. The wireless communication module 302 may include first to third transceivers 310 to 330, duplexers 341 to 343, power amplifying units 351 to 353, a receive filter unit 360, a diplexer 364, and a switch unit 382.

The third transceiver 330 includes the transmit and receive terminals 331a and 331b of a WiFi signal to control the transmission and reception of the WiFi signal. Here, the WiFi signal has frequency bands of 2.4 GHz and 5 GHz. Although not shown in the drawing, the third transceiver 330 may control the transmission and reception of a Bluetooth signal having the same frequency band as the frequency band of the WiFi signal.

The diplexer 364 is connected to the fifth antenna ANT5, the receive terminal 322b of the third signal, and the switch unit 382 to separate the frequency band of the third signal from the frequency band of the WiFi signal.

The switch unit 382 may be configured to selectively connect one of the transmit and receive terminals 331a and 331b of the WiFi signal to the diplexer 364. The switch unit 382 may be realized in the form of a SPDT switch.

A difference from the signal transmit path illustrated in FIG. 2 lies in that the third receive path may be formed to receive the third signal from the fifth antenna ANT5 to the second transceiver 220. The transmit and receive paths of the WiFi signal may be formed to transmit the WiFi signal between the third transceiver 330 and the fifth antenna ANT5. That is, the transmit path of the WiFi signal may be formed to transmit the WiFi signal from the third transceiver 330 to the fifth antenna ANT5 and may be formed to receive the receive path of the WiFi signal from the fifth antenna ANT5 to the third transceiver 330. The other signal transmit paths are as illustrated in FIG. 2.

Figure 11A:
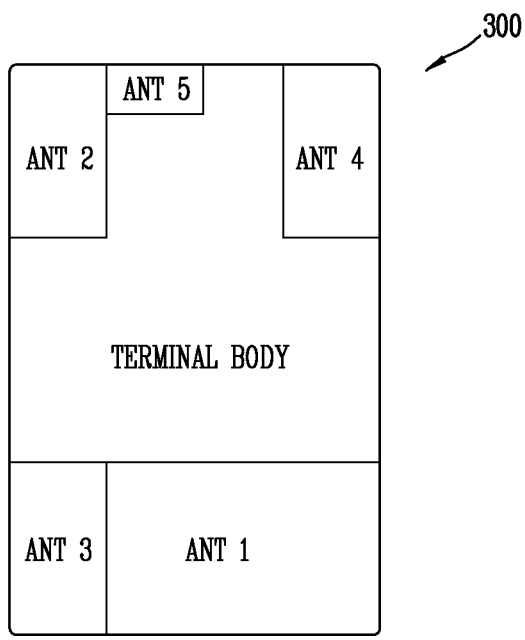
FIGS. 11A to 11H are conceptual illustrations of the antennas illustrated in FIG. 10 that are provided in a main body of the mobile according to various embodiments of the present invention.
Figure 11B:
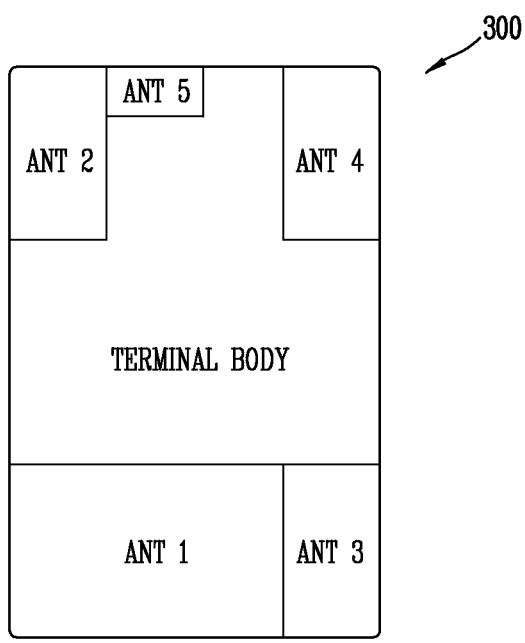
Figure 11C:
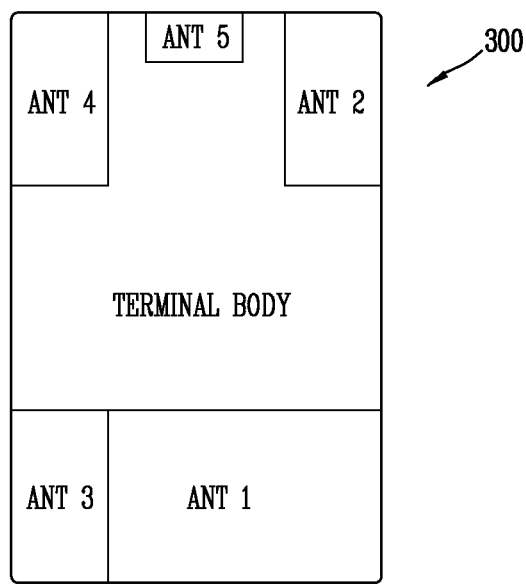
Figure 11D:
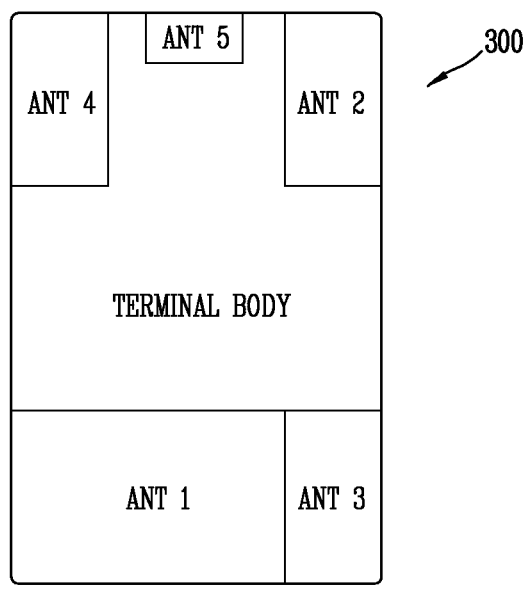
Figure 11E:
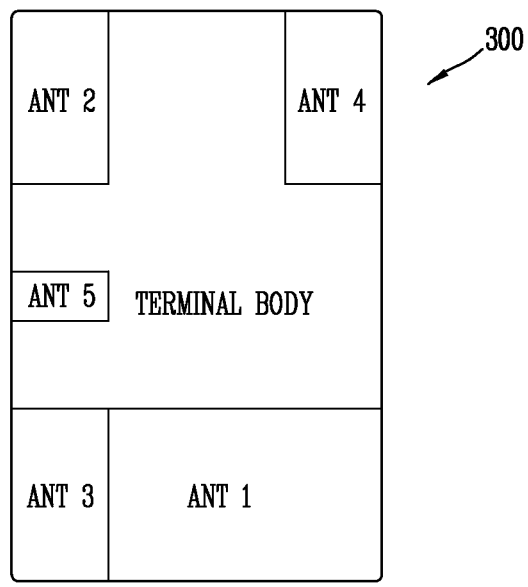
Figure 11F:
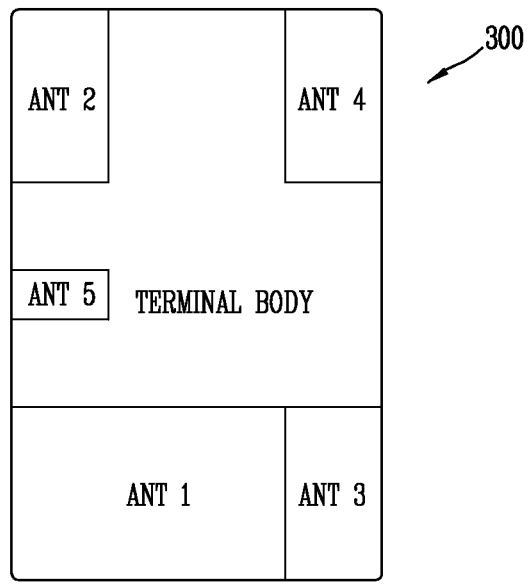
Figure 11G:
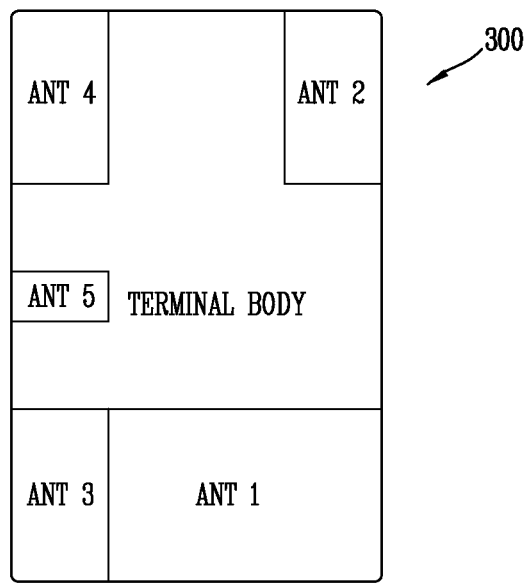
Figure 11H:
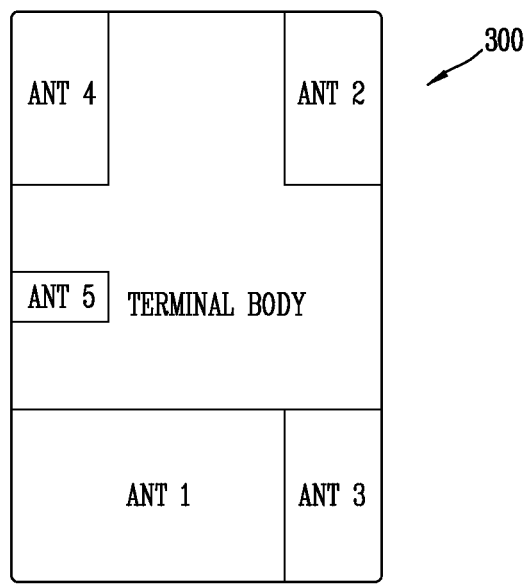

FIGS. 11A to 11H illustrate examples in which the antennas ANT1 to ANT5 illustrated in FIG. 10 are arranged in the main body of the mobile terminal 300. The first to fifth antennas ANT1 to ANT5 may be arranged in different regions of the main body of the mobile terminal 300. For example, as illustrated in the drawing, the first to fourth antennas ANT1 to ANT4 may be arranged at edge portions of the main body of the mobile terminal 300. The fifth antenna ANT5 may be arranged to be adjacent to the second antenna ANT2 as illustrated in FIGS. 11A and 11B or may be arranged between any two antennas among the first to fourth antennas ANT1 to ANT4 as illustrated in FIGS. 11C to 11H.

Figure 12:
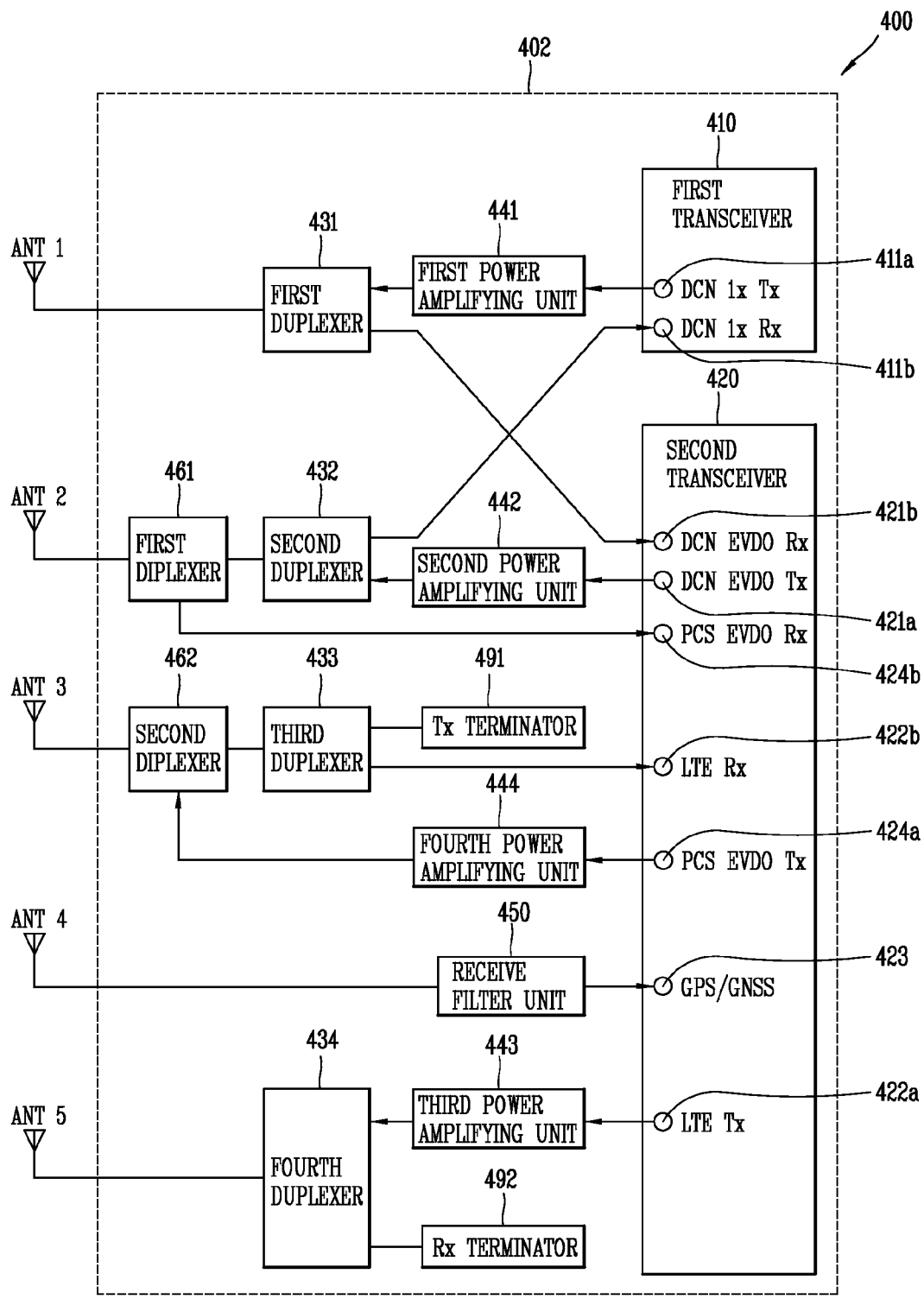
FIG. 12 is a block diagram schematically illustrating a mobile terminal according to still another embodiment of the present invention.

FIG. 12 is a block diagram schematically illustrating a mobile terminal 400 according to still another embodiment of the present invention. Hereinafter, a difference from the mobile terminal 200 illustrated in FIG. 2 will be described.

The mobile terminal 400 may include a wireless communication module 402 and first to fifth antennas ANT1 to ANT5. The wireless communication module 402 may include first and second transceivers 410 and 420, duplexers 431 to 434, power amplifying units 441 to 444, a receive filter unit 450, diplexers 461 and 462, and terminators 491 and 492.

The third duplexer 433 is connected to the second diplexer 462, the receive terminal 422b of the third signal, and the first terminator 491. The fourth duplexer 434 is connected to the fifth antenna ANT5, the third power amplifying unit 443, and the second terminator 492. According to the above-described structure, the third duplexer 433 operates as a band pass filter that transmits the receive frequency of the third signal and the fourth duplexer 434 operates as a band pass filter that transmits the transmit frequency of the third signal.

The first diplexer 461 is connected to the second antenna ANT2, the receive terminal 424b of the fourth signal, and the second duplexer 432 to separate the frequency bands of the signals processed by the second duplexer 432 (the synthetic frequency bands of the first and second signals) from the frequency band of the fourth signal.

The second diplexer 462 is connected to the third antenna ANT3, the third duplexer 433, and the fourth power amplifying unit 444 to separate the frequency bands of the signals processed by the third duplexer 433 (the frequency band of the third signal) from the frequency band of the fourth signal.

A difference from the signal transmit path illustrated in FIG. 2 lies in that the third transmit path may be formed to transmit the third signal from the second transceiver 420 to the fifth antenna ANT5. The fourth transmit path may be formed to transmit the fourth signal from the second transceiver 420 to the third antenna ANT3. The fourth receive path may be formed to receive the fourth signal from the second antenna ANT2 to the second transceiver 420. The other signal transmit paths are illustrated in FIG. 2.

Figure 13A:
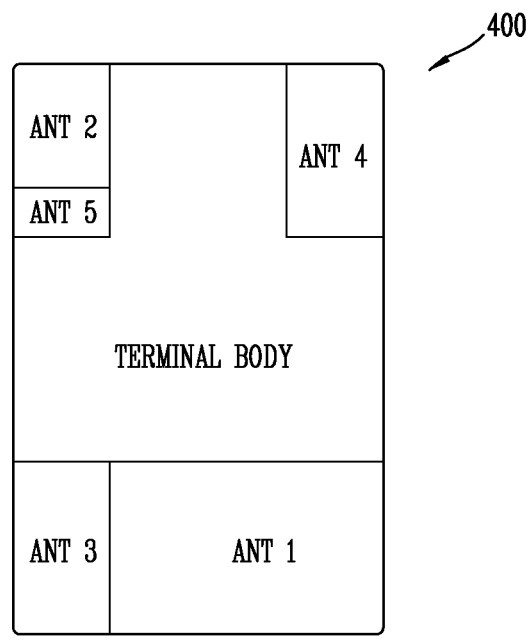
FIGS. 13A to 13C are conceptual illustrations of the antennas illustrated in FIG. 12 that are arranged in a main body of the mobile terminal according to various embodiments of the present invention.
Figure 13B:
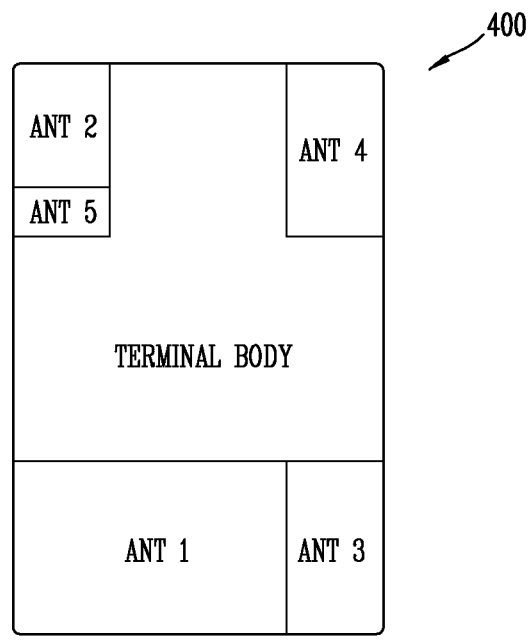
Figure 13C:
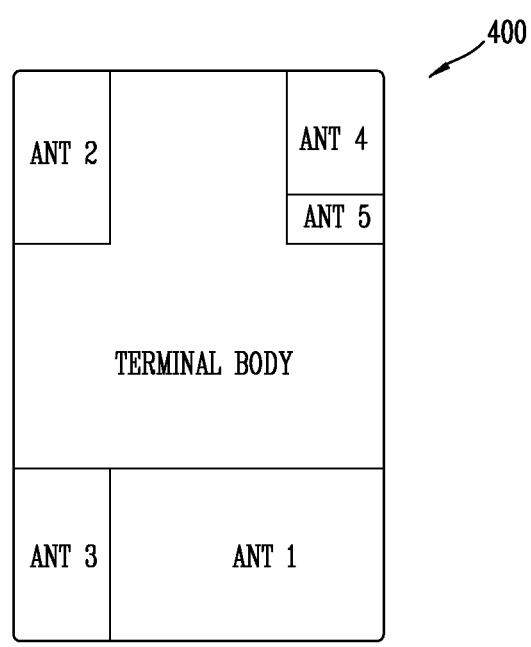

FIGS. 13A to 13C illustrate examples in which the antennas ANT1 to ANT5 illustrated in FIG. 12 are arranged in the main body of the mobile terminal 400. The first to fifth antennas ANT1 to ANT5 may be arranged in different regions of the main body of the mobile terminal 400. For example, as illustrated in the drawings, the first to fourth antennas ANT1 to ANT4 are arranged at edge portions of the main body of the mobile terminal 400 and the fifth antenna ANT5 may be arranged to be adjacent to the second antenna ANT2.

Figure 14:
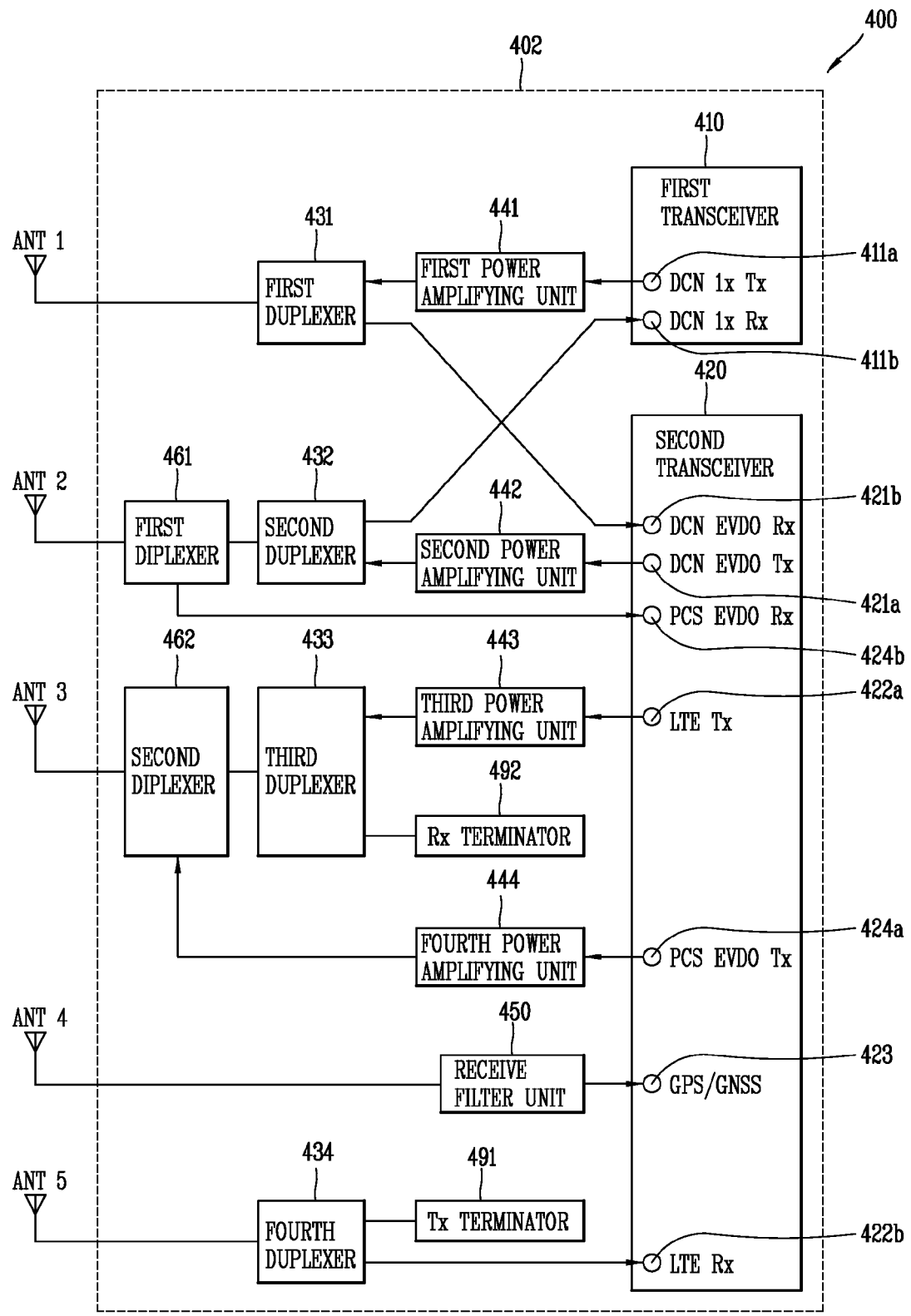
FIG. 14 is a block diagram illustrating a modification of the mobile terminal illustrated in FIG. 12.

The examples in which the antennas ANT1 to ANT5 illustrated in FIGS. 13A to 13C are arranged in the main body of the mobile terminal 400 may be applied to the modifications of the mobile terminal 400 illustrated in FIG. 14. The signals emitted by the antennas ANT1 to ANT5 may vary in accordance with modifications.

FIG. 14 is a block diagram illustrating a modification of the mobile terminal 400 illustrated in FIG. 12. Hereinafter, a difference from the modification of the mobile terminal 400 illustrated in FIG. 12, in particular, the modification of the wireless communication module 402 will be described.

Referring to FIG. 14, the third duplexer 433 is connected to the second diplexer 462, the third power amplifying unit 443, and the second terminator 492. The fourth duplexer 434 is connected to the fifth antenna ANT5, the receive terminal 422b of the third signal, and the first terminator 491.

A difference from the signal transmit path illustrated in FIG. 12 lies in that the third transmit path may be formed to transmit the third signal from the second transceiver 420 to the third antenna ANT3. The third receive path may be formed to receive the third signal from the fifth antenna ANT5 to the second transceiver 420. The other signal transmit paths are as illustrated in FIG. 12.

According to an aspect of the present invention, the above-described method may be realized by a code that may be read by a processor in media where programs are recorded. The media that may be read by the processor include a read only memory (ROM), a random access memory (RAM), a CD-ROM, a magnetic tape, a floppy disk, an optical data storage apparatus, and the like. Realization in the form of a carrier wave (for example, transmission through the Internet) is also included.

In the mobile terminals disclosed herein, the structures and methods of the above-described embodiments are not limitedly applied but all or parts of the embodiments may be selectively combined with each other so that various modifications may be performed.

What is claimed is:

1. A mobile terminal, comprising:
  a main body; and
  a wireless communication module mounted in the main body,
  wherein the wireless communication module comprises:
  a first transceiver including a transmit terminal and a receive terminal of a first signal;
  a second transceiver including a transmit terminal and a receive terminal of a second signal, and a transmit terminal and a receive terminal of a third signal;
  a first duplexer connected to the transmit terminal of the first signal and the receive terminal of the second signal to separate a transmit frequency of the first signal from a receive frequency of the second signal; and
  a second duplexer connected to the receive terminal of the first signal and the transmit terminal of the second signal to separate a receive frequency of the first signal from a transmit frequency of the second signal; and wherein the first signal and the second signal are of a same frequency band and the third signal is of a different frequency band than the first and second signals, wherein the first transceiver selectively controls transmission and reception of the first signal and the second transceiver selectively controls transmission and reception of the second and third signals such that the second transceiver does not transmit and receive the third signal while transmitting and receiving the second signals and does not transmit and receive the second signal while transmitting and receiving the third signal, and wherein a first intermodular distortion (IMD) resulting from a simultaneous processing of the first signal and the third signal at the first duplexer does not affect a receiver sensitivity of the first signal or the second signal and a second intermodular distortion (IMD) resulting from a simultaneous processing of the first signal and the third signal at the second duplexer does not significantly deteriorate a receiver sensitivity of the first signal.

2. The mobile terminal as claimed in claim 1, further comprising first to third antennas arranged in different regions of the main body and connected to the wireless communication module to emit signals generated by the wireless communication module.

3. The mobile terminal as claimed in claim 2, wherein transmit and receive paths of the first signal are formed to connect the transmit terminal of the first signal to the first antenna and to connect the receive terminal of the first signal to the second antenna, and wherein transmit and receive paths of the second signal are formed to connect the transmit terminal of the second signal to the second antenna and to connect the receive terminal of the second signal to the first antenna.

4. The mobile terminal as claimed in claim 3, wherein the transmit path of the first signal and the receive path of the second signal include a section in which the first antenna is connected to the first duplexer, and wherein the receive path of the first signal and the transmit path of the second signal include a section in which the second antenna is connected to the second duplexer.

5. The mobile terminal as claimed in claim 3, wherein transmit and receive paths of the third signal are formed to connect the transmit terminal and the receive terminal of the third signal to the third antenna.

6. The mobile terminal as claimed in claim 5, wherein transmit and receive paths of signals emitted through the first antenna are formed between the first antenna and the first transceiver, wherein the wireless communication module further comprises:

a front end module (FEM) connected to the first antenna and configured to select one of the transmit and receive paths of the signals emitted through the first antenna.

7. The mobile terminal as claimed in claim 5, wherein a degree of isolation between the first antenna and the second antenna is larger than a degree of isolation between the first antenna and the third antenna.

8. The mobile terminal as claimed in claim 3, wherein transmit and receive paths of the third signal are formed to connect the transmit terminal of the third signal to the first antenna and to connect the receive terminal of the third signal to the second antenna.

9. The mobile terminal as claimed in claim 8, wherein the second transceiver further comprises a transmit terminal of a fourth signal and a receive terminal of the fourth signal having a different frequency band from frequency bands of the first to third signals.

10. The mobile terminal as claimed in claim 9, wherein the transmit and receive paths of the third signal are formed to connect the transmit terminal of the fourth signal to the third antenna and to connect the receive terminal of the fourth signal to the second antenna.

11. The mobile terminal as claimed in claim 3, wherein transmit and receive paths of the third signal are formed to connect the transmit terminal of the third signal to the third antenna and to connect the receive terminal of the third signal to the second antenna.

12. The mobile terminal as claimed in claim 3, wherein transmit and receive paths of the third signal are formed to connect the transmit terminal of the third signal to the first antenna and to connect the receive terminal of the third signal to the third antenna.

13. The mobile terminal as claimed in claim 3, further comprising:

the main body comprising a fourth antenna connected to a receive terminal of a Global Positioning System (GPS) signal, wherein the second transceiver further comprises the receive terminal of the GPS signal.

14. The mobile terminal as claimed in claim 13, further comprising:

a third transceiver including a transmit terminal of a WiFi signal and a receive terminal of the WiFi signal; and a fifth antenna arranged in a fifth region of the main body and connected to the transmit terminal of the WiFi signal and the receive terminal of WiFi signal, wherein transmit and receive paths of the third signal are formed to connect the transmit terminal of the third signal to the third antenna and to connect the receive terminal of the third signal to the fifth antenna.

15. The mobile terminal as claimed in claim 13, further comprising a fifth antenna arranged in a fifth region adjacent to a second region in which the second antenna is arranged and connected to the wireless communication module, wherein transmit and receive paths of the third signal are formed to connect the transmit terminal of the third signal to the fifth antenna and to connect the receive terminal of the third signal to the third antenna.

16. The mobile terminal as claimed in claim 13, further comprising a fifth antenna arranged in a fifth region adjacent to a second region in which the second antenna is arranged and connected to the wireless communication module, wherein transmit and receive paths of the third signal are formed to connect the transmit terminal of the third signal to the third antenna and to connect the receive terminal of the third signal to the fifth antenna.

17. The mobile terminal as claimed in claim 1, wherein the first signal is a wireless frequency signal for a voice service, and wherein the second and third signals are wireless frequency signals for a data service.

* * * * *